United States Patent
Hasegawa et al.

(10) Patent No.: US 6,254,694 B1
(45) Date of Patent: Jul. 3, 2001

(54) R-T-B-BASED, PERMANENT MAGNET, METHOD FOR PRODUCING SAME, AND PERMANENT MAGNET-TYPE MOTOR AND ACTUATOR COMPRISING SAME

(75) Inventors: Motohisa Hasegawa, Kumagaya; Takashi Sasaki, Fukaya, both of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/176,724

(22) Filed: Oct. 21, 1998

Related U.S. Application Data

(62) Division of application No. 08/604,927, filed on Feb. 22, 1996, now Pat. No. 5,876,518.

(30) Foreign Application Priority Data

| | | | |
|---|---|---|---|
| Feb. 23, 1995 | (JP) | ...................................................... | 7-35316 |
| Mar. 24, 1995 | (JP) | ...................................................... | 7-65517 |
| Jul. 27, 1995 | (JP) | ...................................................... | 7-191368 |

(51) Int. Cl.$^7$ .................................................. H01F 1/057
(52) U.S. Cl. ........................................ 148/101; 427/127
(58) Field of Search .................................. 148/101, 102, 148/122, 253; 427/127

(56) References Cited

U.S. PATENT DOCUMENTS

| | | |
|---|---|---|
| 4,837,114 | 6/1989 | Hamada et al. . |
| 4,902,357 * | 2/1990 | Imaizumi ............................... 148/101 |
| 4,942,098 | 7/1990 | Hamamura et al. . |
| 5,269,855 | 12/1993 | Ueda et al. . |
| 6,080,498 * | 6/2000 | Kikui et al. ............................ 428/651 |
| 6,106,894 * | 8/2000 | Zapf ....................................... 427/127 |

FOREIGN PATENT DOCUMENTS

| | | |
|---|---|---|
| 62-192566 | 8/1987 | (JP) . |
| 5-226125 | 9/1993 | (JP) . |

* cited by examiner

*Primary Examiner*—John Sheehan
(74) *Attorney, Agent, or Firm*—Finnegan, Henderson, Farabow, Garrett, & Dunner, L.L.P.

(57) ABSTRACT

An R—T—B-based, permanent magnet with improved resistance to the deterioration of magnetic properties by working, electroplating, etc. and to their change with time, wherein R is one or more of rare earth elements including Y, and T is Fe, part of which may be substituted by Co, has (a) a corrosion-resistant film layer having an average thickness of 5 $\mu$m or more on a surface of a sintered magnet having a composition consisting essentially of 20–45 weight % of R, 15 weight % or less of Co, 0.5–6 weight % of B, and 10 weight % or less of M selected from the group consisting of Al, Si, Nb, Mo, V, Mn, Sn, Ni, Zn, Ti, Cr, Ta, W, Ge, Zr, Hf and Ga, the balance being substantially Fe and inevitable impurities, and (b) a layer richer in rare earth elements than a main phase of $R_2Fe_{14}B$ beneath the corrosion-resistant film layer.

8 Claims, 6 Drawing Sheets

EXAMPLE 3

LAYER RICHER IN RARE EARTH ELEMENTS

Fe
Nd
Ni

SURFACE ← | Ni-PLATING LAYER | INSIDE OF SINTERED MAGNET →

COMPARATIVE EXAMPLE 3

Fe
Nd
Ni

SURFACE ← | Ni-PLATING LAYER | INSIDE OF SINTERED MAGNET →

R-T-B-BASED, PERMANENT MAGNET, METHOD FOR PRODUCING SAME, AND PERMANENT MAGNET-TYPE MOTOR AND ACTUATOR COMPRISING SAME

This is a division of application Ser. No. 08/604,927, filed Feb. 22, 1996 now U.S. Pat. No. 5,876,518, which is incorporated herein by reference.

BACKGROUND OF THE INVENTION

The present invention relates to an R—T—B-based, permanent magnet with improved adhesion of a corrosion-resistant film layer to a magnet body as well as improved resistance to the deterioration of magnetic properties by working, electroplating, etc. and to their change with time, a permanent magnet-type motor and a permanent magnet-type actuator comprising such an R—T—B-based, permanent magnet.

Accompanied by recent market trend of miniaturization and weight reduction of electronic equipment and precision instrument, rare earth magnets have found wider applications in many fields in place of conventional Alnico magnets and ferrite magnets. Among the rare earth magnets, R—T—B-based, permanent magnets have particularly earned increasing needs because of high energy product, and higher energy product and coercivity tend to be required. However, since the R—T—B-based, permanent magnets are based on rare earth elements and iron, they are easily oxidized in the air to form stable oxides. Accordingly, if the R—T—B-based, permanent magnets without corrosion-resistant film layers are assembled into magnetic circuits of electronic equipment, etc., oxidation takes place on magnet surfaces and proceeds into the inside of the magnets. As a result, their magnetic properties are deteriorated, leading to reduction in performance of electronic equipment, etc., and oxides peel off from the magnet surfaces, contaminating adjacent elements with magnetic materials. For these reasons, various surface treatment methods have been proposed to prevent the oxidation of the R—T—B-based, permanent magnets.

For instance, there have been proposed resin coating methods by spraying or electrodeposition, gas deposition methods such as vacuum vapor deposition, ion sputtering, ion plating, etc., and electro- or electroless plating methods of metals or alloys of Cr, Ni, etc. For the R—T—B-based, permanent magnets which may be used at a temperature of 100° C. or higher, metal plating, etc. is more utilized than coatings of resins having low glass transition temperatures from the aspect of cost and reliability.

However, if permanent magnets provided with corrosion-resistant film layers by electro- or electroless plating methods are used for permanent magnet-type motors or actuators which may be used at such an elevated temperature as 120° C. or higher, deterioration of magnetic properties takes place in the permanent magnets, resulting in the reduction of performance of the permanent magnet-type motors or actuators.

In addition, because degreasing, activation, etc. with alkalis or acids are carried out as pretreatments in the electro- or electroless plating methods, grain boundary phases generating coercivity are dissolved away from the magnet surfaces in the course of the pretreatments, resulting in the formation of layers of low magnetic properties between main phases and corrosion-resistant film layers on the magnet surfaces, thereby lowering the magnetic properties of the permanent magnets. Particularly in the case of thin permanent magnets, the magnetic properties deteriorate drastically.

The formation of a low-magnetic properties phase is schematically shown in FIG. 1. In a sintered R—T—B magnet coated with a corrosion-resistant film layer 1, there are grain boundaries 3 between crystal grains 2 composed of a main phase of $R_2Fe_{14}B$, with a rare earth element-rich phase 4 and a boron-rich phase 5 therebetween. The rare earth element-rich phase 4 in contact with the corrosion-resistant film layer 1 is partly dissolved away, leaving layers 8 having low-magnetic properties. Some crystal grains 2 of the main phase may have cracks 7 near the low-magnetic properties areas 8.

To assemble the R—T—B-based, permanent magnets into electronic equipment, it is necessary to cut or grind totally or partially their surfaces before the formation of corrosion-resistant film layers. In this case, too, the magnet surfaces are disordered or plastically deformed to form damaged layers which may be referred to as "damaged layers," resulting in the reduction of magnetic properties. There is a disadvantage that corrosion-resistant film layers formed on the damaged layers are highly likely to peel off from the damaged layers. This is schematically shown in FIG. 2. There is a damaged layer 6 between the crystal grains 2 of the main phase and the corrosion-resistant film layer 1. It is also noted that crystal grains in the damaged layer 6 are severely cracked as shown by the reference numeral 7. The same reference numerals denote the same phases in FIGS. 1 and 2.

OBJECT AND SUMMARY OF THE INVENTION

Accordingly, an object of the present invention is to provide a permanent magnet free from deterioration of magnetic properties at a temperature of 120° C. or higher and not suffering from deterioration due to working and electro- or electroless plating.

Another object of the present invention is to provide a method for producing such a permanent magnet.

A further object of the present invention is to provide a permanent magnet-type motor comprising such a permanent magnet.

A still further object of the present invention is to provide a permanent magnet-type actuator comprising such a permanent magnet.

In view of the above objects, it has been found that an R—T—B-based, permanent magnet with a corrosion-resistant film layer on its surface can be provided with improved resistance to a high-temperature deterioration of magnetic properties and to their deterioration with time, by generating a layer richer in rare earth elements than a main phase of $R_2Fe_{14}B$ beneath the corrosion-resistant film layer by a proper heat-treatment.

Thus, the R—T—B-based, permanent magnet according to the first embodiment of the present invention has (a) a corrosion-resistant film layer on a surface thereof, and (b) a layer richer in rare earth elements than a main phase of $R_2Fe_{14}B$ beneath the corrosion-resistant film layer, wherein R is one or more of rare earth elements including Y, and T is Fe, part of which may be substituted by Co.

The R—T—B-based, permanent magnet according to the second embodiment of the present invention has (a) a damaged layer existing in a surface region thereof, (b) a corrosion-resistant film layer coated on a surface of the damaged layer, and (c) a layer richer in rare earth elements than a main phase of $R_2Fe_{14}B$ between the damaged layer and the corrosion-resistant film layer, wherein R is one or more of rare earth elements including Y, and T is Fe, part of which may be substituted by Co.

The R—T—B-based, permanent magnet according to the third embodiment of the present invention has (a) a corrosion-resistant film layer on a surface thereof, (b) a layer richer in rare earth elements than a main phase of $R_2Fe_{14}B$ beneath the corrosion-resistant film layer, and (c) a reaction layer between the corrosion-resistant film layer and the rare earth element-rich layer, wherein R is one or more of rare earth elements including Y, and T is Fe, part of which may be substituted by Co.

The method for producing an R—T—B-based, permanent magnet according to the fourth embodiment of the present invention comprises the steps of:

(1) forming a corrosion-resistant film layer on a surface of a sintered magnet having a composition of R—T—B; and (2) subjecting the sintered magnet provided with the corrosion-resistant film layer to a heat treatment at a temperature of 400–700° C. in an inert or non-oxidizing atmosphere or in vacuum, such that a layer richer in rare earth elements than a main phase of $R_2Fe_{14}B$ is generated beneath the corrosion-resistant film layer, wherein R is one or more of rare earth elements including Y, and T is Fe, part of which may be substituted by Co.

The method for producing an R—T—B-based, permanent magnet, wherein R is one or more of rare earth elements including Y, and T is Fe, part of which may be substituted by Co, according to the fifth embodiment of the present invention comprises the steps of:

(1) forming a corrosion-resistant film layer having an average thickness of 5 μm or more on a surface of a sintered magnet having a composition consisting essentially of 20–45 weight % of R, 15 weight % or less of Co, 0.5–6 weight % of B, and 10 weight % or less of M selected from the group consisting of Al, Si, Nb, Mo, V, Mn, Sn, Ni, Zn, Ti, Cr, Ta, W, Ge, Zr, Hf and Ga, the balance being substantially Fe and inevitable impurities; and (2) subjecting the sintered magnet provided with the corrosion-resistant film layer to a heat treatment at a temperature of 400–700° C. in an inert or non-oxidizing atmosphere or in vacuum, such that a layer richer in rare earth elements than a main phase of $R_2Fe_{14}B$ is generated beneath the corrosion-resistant film layer.

The method for producing an R—T—B-based, permanent magnet, wherein R is one or more of rare earth elements including Y, and T is Fe, part of which may be substituted by Co, according to the sixth embodiment of the present invention comprises the steps of:

(1) forming a first corrosion-resistant film layer on a surface of a sintered magnet having, a composition consisting essentially of 20–45 weight % of R, 15 weight % or less of Co and 0.5–6 weight % of B, the balance being substantially Fe and inevitable impurities;

(2) subjecting the sintered magnet provided with the corrosion-resistant film layer to a heat treatment at a temperature of 400–700° C. in an inert or non-oxidizing atmosphere or in vacuum, such that a layer richer in rare earth elements than a main phase of $R_2Fe_{14}B$ is generated beneath the corrosion-resistant film layer; and (3) forming a second corrosion-resistant film layer on a surface of the heat-treated sintered magnet.

The permanent magnet-type motor according to the seventh embodiment of the present invention comprises an R—T—B-based, permanent magnet, wherein R is one or more of rare earth elements including Y, and T is Fe, part of which may be substituted by Co, as a field magnet in a magnetic circuit which may be subject to a temperature of 120° C. or higher, the R—T—B-based, permanent magnet having (a) a corrosion-resistant film layer on a surface thereof, and (b) a layer richer in rare earth elements than a main phase of $R_2Fe_{14}B$ beneath the corrosion-resistant film layer.

The permanent magnet-type actuator according to the eighth embodiment of the present invention comprises an R—T—B-based, permanent magnet, wherein R is one or more of rare earth elements including Y, and T is Fe, part of which may be substituted by Co, as a field magnet in a magnetic circuit which may be subject to a temperature of 120° C. or higher, the R—T—B-based, permanent magnet having (a) a corrosion-resistant film layer on a surface thereof, and (b) a layer richer in rare earth elements than a main phase of $R_2Fe_{14}B$ beneath the corrosion-resistant film layer.

DETAILED DESCRIPTION OF THE INVENTION

First, the principle of the present invention will be described in detail below.

If the R—T—B-based, sintered magnet is worked by cutting or grinding, or subjected to electro- or electroless plating, the deterioration of magnetic properties would generally occur. The present invention has solved such problems by coating the R—T—B-based, sintered magnet with a corrosion-resistant film layer and heat-treating it at such a temperature that a layer richer in rare earth elements than a main phase of $R_2Fe_{14}B$ is generated at a proper thickness beneath the corrosion-resistant film layer. With such structure, the R—T—B-based, permanent magnet can stably show excellent magnetic properties even at a temperature of 120° C. or higher.

The mechanism of the deterioration of magnetic properties may be considered as follows: Since the coercivity-generating mechanism is a nucleation type in the R—T—B-based, permanent magnet of the present invention, the level of coercivity is determined by lattice defects or the number of dislocations in the main phase of $R_2Fe_{14}B$ which constitutes seeds of reverse magnetic domains, or by a crystal structure or its amount of a grain boundary phase surrounding the main phase of $R_2Fe_{14}B$, which functions to pin down the seeds of reverse magnetic domains. Accordingly, when there are cracks or strain in the main phase due to working such as cutting or grinding, or when there are crystal grains of the main phase without the grain boundary phase, the seeds of reverse magnetic domains are highly likely to be formed, or magnetic domain walls easily move, resulting in the deterioration of coercivity. Also, in a pretreatment with acid or alkali prior to the formation of a corrosion-resistant film layer, the grain boundary phase tends to be dissolved away from a surface of the permanent magnet, resulting in the deterioration of coercivity. Such phenomena are remarkable in the case of a thin R—T—B-based, permanent magnet.

In addition to the above, the magnetic properties of the R—T—B-based, sintered magnet tend to deteriorate at a temperature of 120° C. or higher, presumably because liquids for the pretreatment and/or the plating corrode the magnet at an elevated temperature, and because hydrogen generated in the pretreatment and/or plating process remains on a magnet surface or in a plating layer and moves in the grain boundary phase at an elevated temperature, thereby causing brittle fracture of the grain boundary phase which will generate coercivity.

Figure 1:
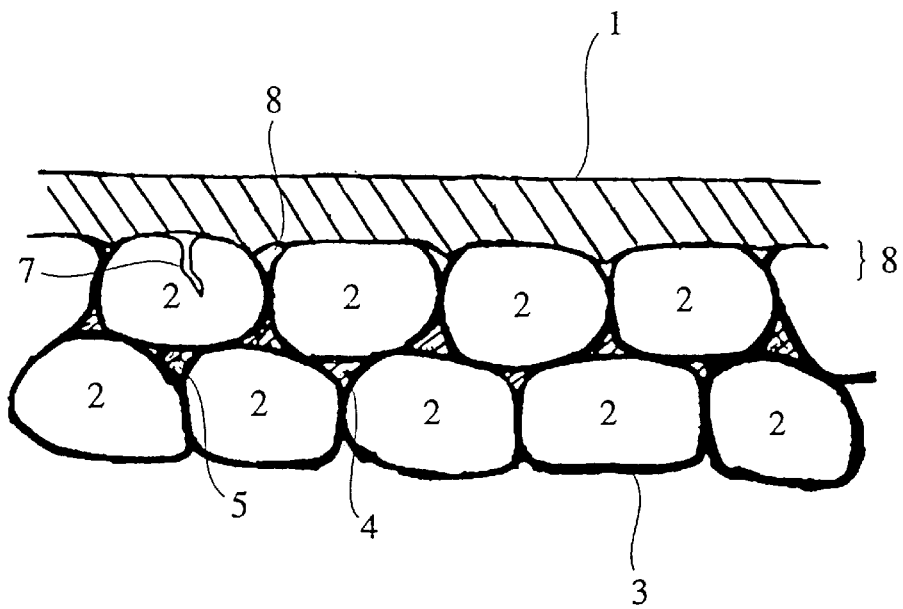
FIG. 1 is a schematic, cross-sectional view showing a conventional R—T—B-based, permanent magnet with a corrosion-resistant film layer.
Figure 2:
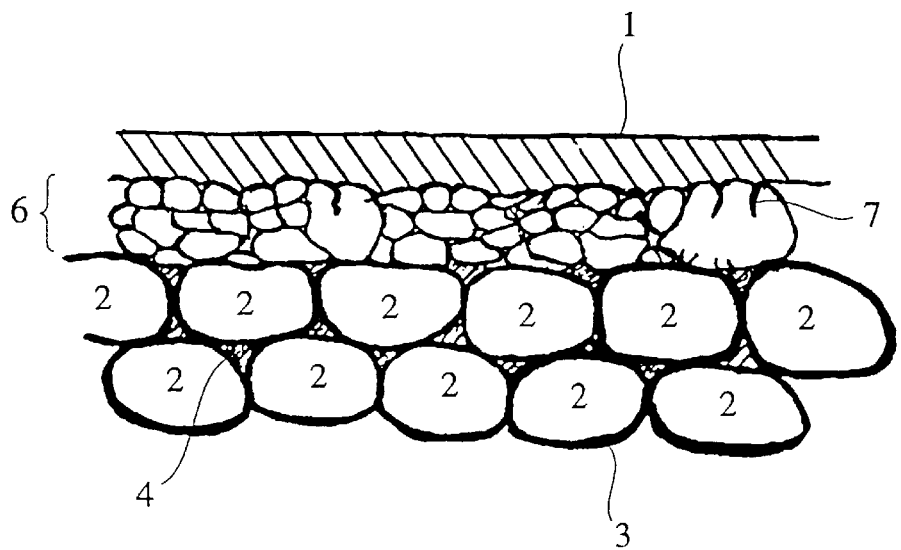
FIG. 2 is a schematic, cross-sectional view showing a conventional R—T—B-based, permanent magnet with a damaged layer and a corrosion-resistant film layer.
Figure 3:
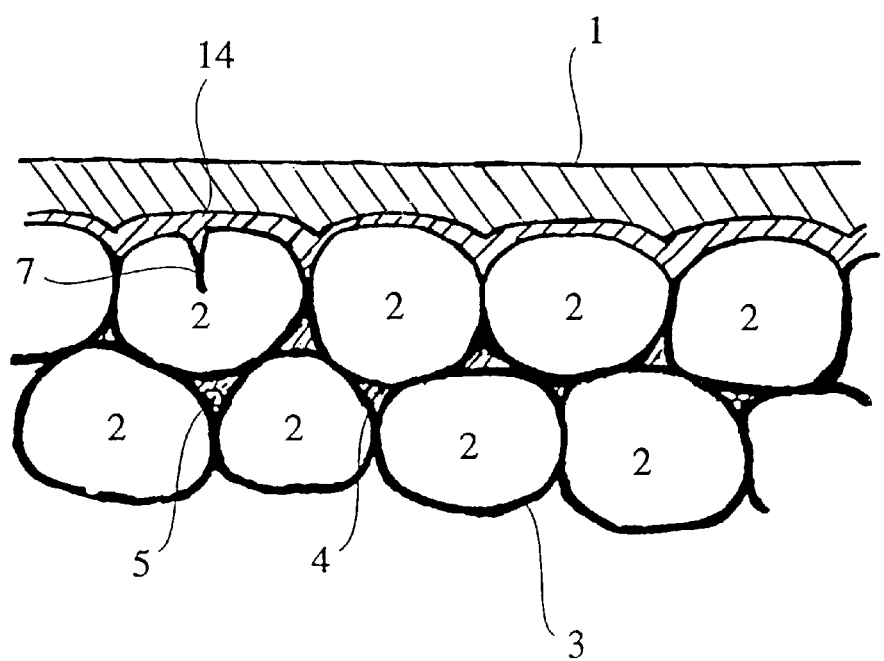
FIG. 3 is a schematic cross-sectional view showing the R—T—B-based, permanent magnet of the present invention having a layer richer in rare earth elements than a main phase beneath a corrosion-resistant film layer.

The present invention is based on the idea of utilizing a rare earth element-rich layer generated beneath the corrosion-resistant film layer in the R—T—B-based, sintered magnet by a proper heat treatment, to prevent the above mechanism of the deterioration of magnetic properties. FIG. 3 schematically shows the crystal grain structure of the R—T—B-based, permanent magnet of the present invention in a surface region. In general, there are grain boundaries 3 between crystal grains 2 composed of a main phase of $R_2Fe_{14}B$, with a rare earth element-rich phase 4 therebetween. The rare earth element-rich layer 14 exists between the crystal grains (main phase) 2 and the corrosion-resistant film layer 1. The rare earth element-rich layer 14 serves to protect the surface of the main phase 1, so that the magnetic properties of the R—T—B-based, permanent magnet would not deteriorate even if there are cracks 7 in the crystal grains (main phase) 2.

The present invention is characterized by heat-treating the R-Fe-B-based, sintered magnet at such a temperature (400–700° C.) that a liquid phase is generated in the sintered magnet coated with a corrosion-resistant film layer. By the generation of the liquid phase during the heat treatment, a layer damaged by working, pretreating or plating can be recovered. As a result, the R—T—B-based, permanent magnet of the present invention can exhibit an optimum coercivity.

The conditions for achieving the above effects of the present invention are as follows:

(1) The sintered magnet should contain a large amount of a rare earth-rich phase.

(2) A heat treatment should be conducted at such a temperature that a liquid phase richer in rare earth elements than a main phase of $R_2Fe_{14}B$ is generated beneath the corrosion-resistant film layer.

(3) A heat treatment should be conducted at such a temperature that the magnetic properties (particularly coercivity) are not deteriorated.

(4) A heat treatment should be conducted at such a temperature that the corrosion-resistant film layer can maintain its performance. A temperature at which pin-holes are formed or a temperature at which crystallization takes place should be avoided.

(5) The corrosion-resistant film layer should be of industrial advantages.

Specific explanation will be made below on the R—T—B-based, permanent magnet and applications thereof.

[1] R—T—B-based, Permanent Magnet

[A] R-Fe-B-based, Sintered Magnet (1) Composition

The composition of the R—T—B-based, sintered magnet comprises three essential elements of R, T and B. The R—T—B-based, sintered magnet may also contain at least one element M selected from the group consisting of Al, Si, Nb, Mo, V, Mn, Sn, Ni, Zn, Ti, Cr, Ta, W, Ge, Zr, Hf and Ga.

(a) R: 20–45 Weight %

R is one or more rare earth metals including Y, for instance, Nd, Dy, Pr, Ce, La, Y, etc. When R is less than 20 weight %, α-Fe is likely to be formed, thereby failing to obtain sufficient coercivity iHc. On the other hand, when it exceeds 40 weight %, a rare earth element-rich layer which is a non-magnetic phase occupies a large percentage in the structure of the magnet alloy, thereby failing to obtain a sintered magnet with excellent residual magnetic flux density Br. Thus, the amount of R is 20–45 weight %. The more preferred amount of R is 25–35 weight %.

(b) B: 0.5–6 Weight %

B is an indispensable element, and when B is less than 0.5 weight %, a main phase may be of a rhombohedral system, thereby resulting in low iHc. On the other hand, when it exceeds 6 weight %, a B-rich phase which is a non-magnetic phase occupies a large percentage in the structure of the magnet alloy, thereby providing the sintered magnet with a reduced Br. Thus, the amount of B is 0.5–6 weight %. The more preferred amount of B is 0.8–1.4 weight %.

(c) T: Remainder

T is Fe, part of which may be substituted by Co. Fe is an indispensable element. In the R—T—B-based, sintered magnet comprising 20–45 weight % of R and 0.5–6 weight % of B, the amount of Fe is 50–79.5 weight %. When Fe is less than 50 weight %, the residual magnetic flux density of the sintered magnet is low. When it exceeds 79.5 weight %, the sintered magnet is not provided with a high coercivity. Thus, the amount of Fe is 50–79.5 weight %. The more preferred amount of Fe is 63–75 weight %.

To improve the temperature characteristics and corrosion resistance of the sintered magnet without deteriorating its magnetic properties, part of Fe may be substituted by Co. When the amount of Co exceeds 15 weight % based on the total amount of the sintered magnet, the sintered magnet has deteriorated magnetic properties, particularly conventional. To achieve the above effects, the amount of Co added is preferably 0.1 weight % or more. Thus, the amount of Co substituting for Fe is preferably 0.1–15 weight %, and more preferably 1–10 weight %.

(d) Cu: 5 Weight % or Less

Cu is an element necessary for expanding a heat treatment temperature range at which the optimum coercivity can be obtained, thereby improving the productivity of the R—T—B-based, sintered magnet. When the amount of Cu is more than 5 weight %, the resultant R—T—B-based, sintered magnet has a reduced residual magnetic flux density. Therefore, the amount of Cu added is preferably 5 weight % or less. The addition of Cu contributes to lowering the optimum heat treatment temperature. Accordingly, when a heat treatment is carried out after forming the corrosion-resistant film layer, the crystallization of the corrosion-resistant film layer is preferably suppressed to some extent.

(e) M: 10 Weight % or Less

The R—T—B-based, sintered magnet may contain 10 weight % or less of an additional element M selected from the group consisting of Al, Si, Nb, Mo, V, Mn, Sn, Ni, Zn, Ti, Cr, Ta, W, Ge, Zr, Hf and Ga to improve magnetic properties and mechanical properties thereof. If the amount of M exceeds 10 weight %, the magnetic properties of the sintered magnet would be deteriorated. The more preferred amount of M, if any, is 0.5–5 weight %.

(2) Production

A powder mixture having the above composition is compacted by die pressing, etc., preferably in a magnetic field, to form a green body which is then sintered at 1000–1300° C. The sintering method per se may be the same as those conventionally known.

(3) Alloy Structure

The R—T—B-based, sintered magnet of the present invention is preferably a sintered magnet having an alloy structure in which a main phase having an average grain diameter of 1–50 $\mu$m is constituted by a compound phase of $R_2Fe_{14}B$ having a tetragonal crystal structure. The R—T—B-based, sintered magnet of the present invention is preferably an anisotropic sintered magnet having a maximum energy product of 20 MOe or more.

[B] Corrosion-resistant Film Layer

After pretreating the R—T—B-based, sintered magnet with an acid or alkali solution of phosphoric acid, sodium hydroxide, etc., a corrosion-resistant film layer is formed on a surface of the R—T—B-based, sintered magnet by a generally known method such as electroplating, electroless plating, vapor deposition, etc. From the viewpoint of cost and uniformity in thickness, and to form a relatively thick corrosion-resistant film layer free from pinholes, the electro- or electroless plating method is preferable.

The corrosion-resistant film layer is preferably a metal or alloy layer made of at least one element selected from the group consisting of Zn, Cr, Ni, Cu, Sn, Pb, Cd, Ti, W, Co, Al and Ta. More preferably, the corrosion-resistant film layer is made of a metal such as Ni, Cu, Ti, Cr, Zn or an alloy such as Ni—Co, Ni—W, etc.

In another embodiment, the corrosion-resistant film layer is made of a compound of at least one element selected from the group consisting of Zn, Cr, Ni, Cu, Sn, Pb, Cd, Ti, W, Co, Al and Ta and at least one element selected from the group consisting of C, P, S, N and O. More preferably, the corrosion-resistant film layer is made of compounds such as Ni—P, Ni—Co—P, Cu—S, Ni—Cr—P, etc.

The corrosion-resistant film layer preferably has an average thickness of 5 $\mu$m or more. If the average thickness of the corrosion-resistant film layer is less than 5 $\mu$m, the corrosion-resistant film phase would be likely to have pinholes through which a rare earth element-rich layer easily oozes out during the heat treatment, whereby the sintered magnet would not be fully protected from oxidation and corrosion. On the other hand, if the corrosion-resistant film layer is as thick as more than 50 $\mu$m, the corrosion-resistant film layer would lose a flatness. Thus, the upper limit of the average thickness of the corrosion-resistant film layer is preferably 50 $\mu$m. The more preferred average thickness of the corrosion-resistant film layer is generally 10–50 $\mu$m.

[C] Rare Earth Element-rich Layer

After forming the corrosion-resistant film layer, the R—T—B-based, permanent magnet is heat-treated to generate a layer richer in rare earth elements than the main phase, which is simply referred to as "rare earth element-rich layer," beneath the corrosion-resistant film layer. The rare earth element-rich layer contains a rare earth element R in an amount of 80 weight % or more, for instance, about 90 weight %.

The heat treatment is preferably conducted at 400–700° C. in an inert or non-oxidizing atmosphere or in vacuum. When the heat treatment temperature is lower than 400° C., it is difficult to generate the rare earth element-rich layer. On the other hand, when the temperature is higher than 700° C., the magnetic properties of the permanent magnet are deteriorated. In order that the magnetic properties, particularly coercivity, of the permanent magnet are not deteriorated at a temperature of 120° C. or higher, the heat treatment temperature is preferably 450–650° C., more preferably 470–550° C. The heat treatment atmosphere may be an inert atmosphere, a non-oxidizing atmosphere or vacuum. Though the heat treatment time may change depending on the temperature, it may be 1 minute to 5 hours.

Also, when there is a layer having deteriorated magnetic properties due to damaging by working such as cutting, grinding, etc. (referred to as "damaged layer") near a surface of the permanent magnet, such a layer is also covered by a layer richer in rare earth elements than the main phase, thereby preventing the magnetic properties of the permanent magnet from deteriorating on a magnet surface.

[D] In Case of Corrosion-resistant Film Layer of Multi-layer Structure

Though the corrosion-resistant film layer described above is of a single-layer structure, it may have a multi-layer structure. Because the corrosion-resistant film layer becomes brittle due to crystallization by the subsequent heat treatment, it is preferable to form a corrosion-resistant film layer again after the heat treatment. In the multi-layer film thus formed, an upper layer may be formed by pretreating the heat-treated, corrosion-resistant film layer-coated permanent magnet with an acid or alkali solution of phosphoric acid, sodium hydroxide, etc., and by forming a corrosion-resistant film layer by the same method as described above (electroplating, electroless plating, vapor deposition, etc.). Also, a resin coat may be formed. Because the multi-layer film is more effective to prevent a rare earth element-rich phase from leaking through pinholes than the single-layer film, the multi-layer film is more preferable. In the case of the multi-layer structure, the average thickness of the corrosion-resistant film layer is preferably 10 $\mu$m or more, more preferably 10–50 $\mu$m.

[2] Permanent Magnet-type Motor

Figure 4:
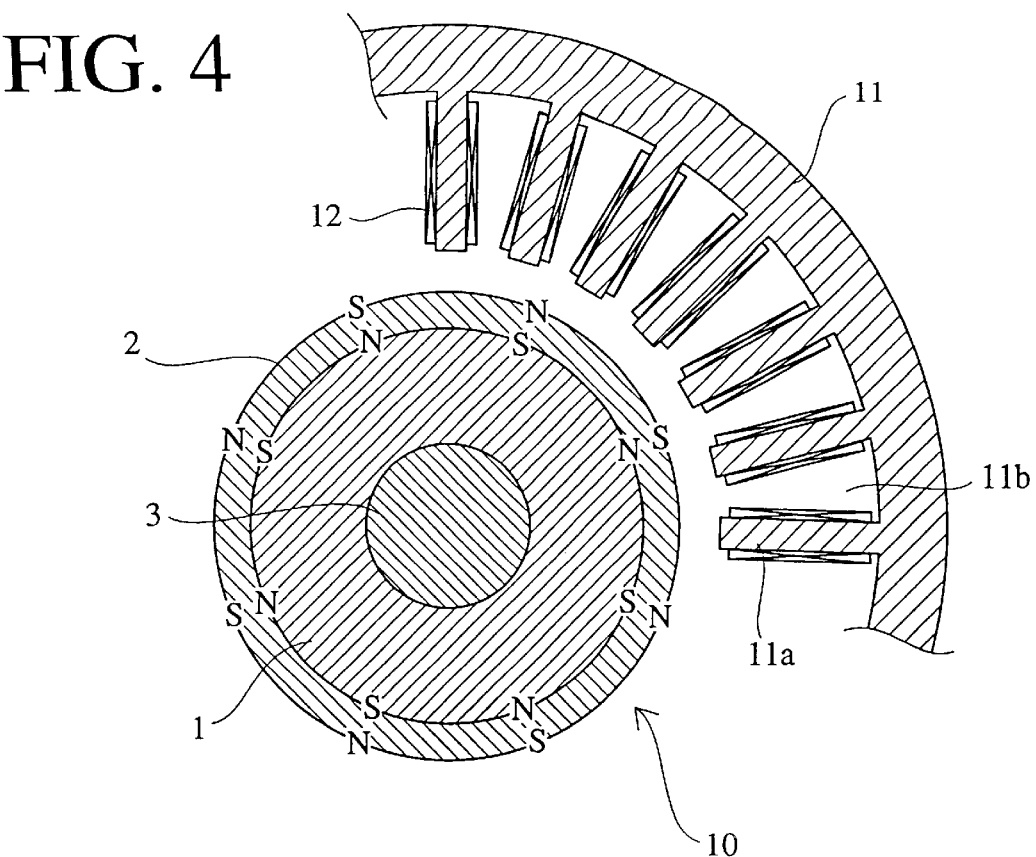
FIG. 4 is a schematic, partial, cross-sectional view showing the permanent magnet-type motor according to one embodiment of the present invention.

FIG. 4 schematically shows a permanent magnet-type motor according to one embodiment of the present invention which comprises a permanent magnet rotor 10, a stator 11 disposed around the rotor 10 and having teeth (inward projections) 11a with constant gaps 11b therebetween, and coils 12 each wound around each tooth 11a. The permanent magnet rotor 10 is constituted by a shaft 3, a magnetic core 1 fixed to the shaft 3, and a cylindrical permanent magnet member 2 bonded to the core 1 by an adhesive, etc.

The cylindrical permanent magnet member 2 may be a radially magnetized, integral cylindrical magnet having a plurality of (8 in this embodiment) magnetic poles on each side with their polarities changing alternately, or may be constituted by a plurality of radially magnetized, arcuate permanent magnet pieces bonded together such that magnetic poles are arranged alternately on each of inner and outer surfaces of the cylindrical permanent magnet member 2. In any case, there is a magnetic gap between the cylindrical permanent magnet member 2 and the stator 11.

The permanent magnet constituting an integral cylindrical magnet or each arcuate permanent magnet piece is coated with a corrosion-resistant film layer and then heat-treated to have a layer richer in rare earth elements than a main phase beneath the corrosion-resistant film layer. The detailed structure of the permanent magnet member is the same as described above.

[3] Permanent Magnet-type Actuator

Figure 5:
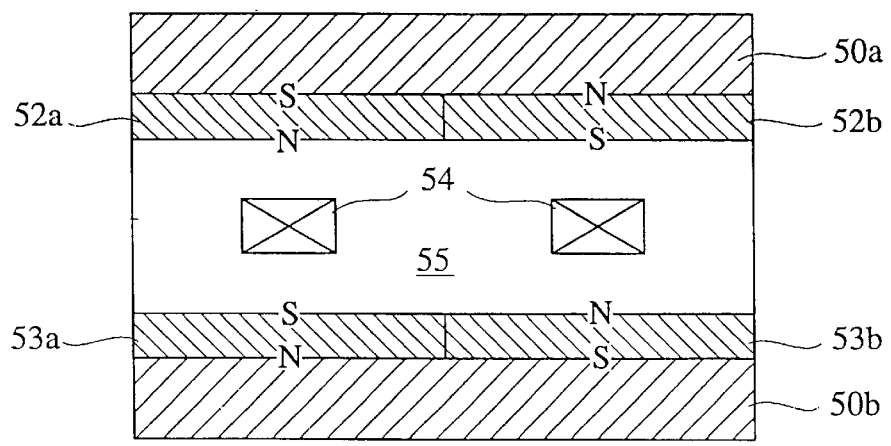
FIG. 5 is a schematic, partial, cross-sectional view showing the permanent magnet-type actuator according to one embodiment of the present invention.

FIG. 5 schematically shows a permanent magnet-type actuator according to one embodiment of the present invention which comprises a pair of back yokes 50a, 50b, permanent magnet blocks 52a, 52b bonded to an inner surface of the back yokes 50a, permanent magnet blocks 53a, 53b bonded to an inner surface of the back yokes 50b, and a movable coil 54 disposed in a magnetic gap 55 defined by the permanent magnet blocks 52a, 52b, 53a, 53b. The permanent magnet blocks 52a, 52b, 53a, 53b are magnetized in a thickness direction and bonded to the back yokes 50a, 50b such that opposite magnetic poles are arranged not only on each permanent magnet surface facing the magnetic gap 55 but also between opposing pairs of the permanent magnet blocks 52a, 52b and 53a, 53b.

Each of the permanent magnet blocks is coated with a corrosion-resistant film layer and then heat-.treated to have a layer richer in rare earth elements than a main phase beneath the corrosion-resistant film layer. The detailed structure of each permanent magnet block is the same as described above.

The present invention will be described in further detail by ways of the following Examples without intention of restricting the scope of the present invention.

Example 1

A magnet alloy having a composition by weight of 18.1% of Nd, 5.2% of Pr, 9.0% of Dy, 0.3% of Al, 1.0% of Nb, 1.03% of B, 4.0% of Co and 0.15% of Ga, the balance being substantially Fe, was melted in a high-frequency furnace in an Ar gas atmosphere to produce a cast ingot. The resultant ingot was crushed into blocks of 50 mm or less, and the alloy blocks were charged into a container into which an Ar gas was introduced for 20 minutes to purge air. After introducing a hydrogen gas at 1 kgf/cm$^2$ into the container for 2 hours, the alloy blocks were mechanically pulverized to coarse powder having an average diameter of 500 μm. The coarse powder was then finely pulverized by a jet mill to fine powder having an average diameter of 5.0 μm.

The fine powder was charged into a cavity of a die equipped with a lower plunger movable up and down, and compacted at 2 ton/cm$^2$ into a green body while being oriented in a magnetic field of about 10 kOe. The resultant green body was sintered at 1080° C. for 2 hours and then heat-treated at 530° C. for 1 hour in an Ar gas atmosphere. A specimen of 10 mm×11 mm×8 mm (magnetization direction: same as the direction of an 8-mm-long side) was machined from the resultant sintered magnet, ground and pretreated with a phosphoric acid solution, and then subjected to Ni electroplating to an average thickness of 20 μm in a Watts bath.

The Ni-plated specimen was heat-treated at 530° C. for 1 hour in an Ar gas atmosphere to form a rare earth element-rich layer having an average thickness of 1.5 μm beneath the Ni-plating layer. The Ni-plated specimen was then measured with respect to an irreversible loss of flux by the following procedure: First, a magnetic flux $\phi_0$ was measured at room temperature on a specimen after magnetization. After the specimen was heated at a stepwise elevating temperature with increment of 20° C. from 100° C. to 260° C. (100° C., 120° C., . . . 260° C.) each for 1 hour, it was cooled down to room temperature. After leaving it to stand for more than 1 hour, it was measured again with respect to a magnetic flux $\phi$. The irreversible loss of flux was calculated by the formula (I):

$$\text{Irreversible loss of flux}=\{(\phi-\phi_0)/\phi_0\}\times 100\% \quad (I)$$

Figure 6:
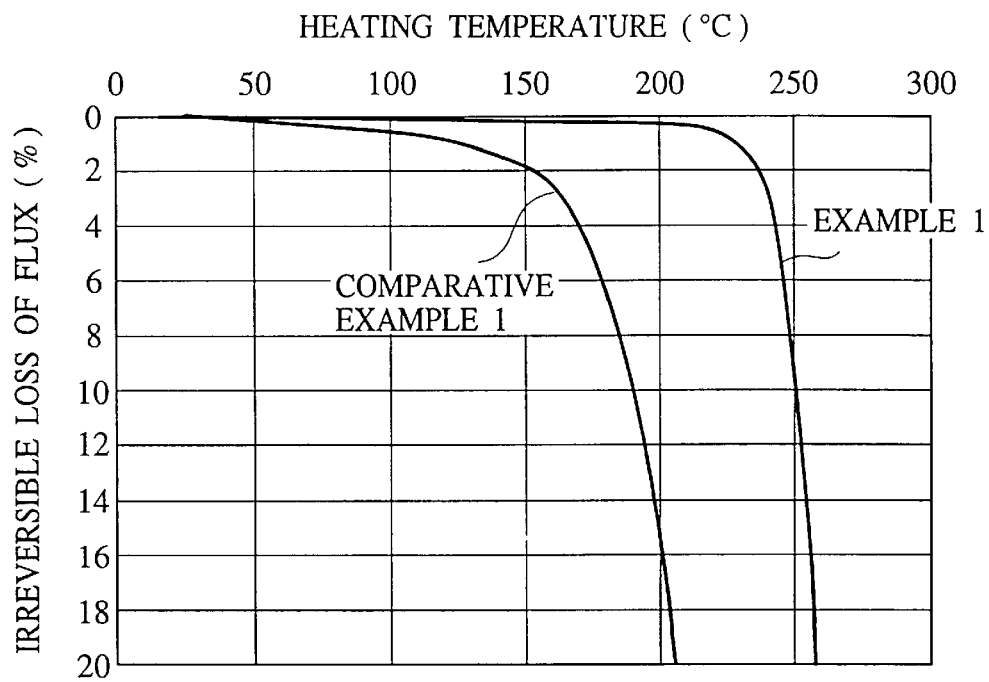
FIG. 6 is a graph showing the change of an irreversible loss of flux with a heating temperature in Example 1 and Comparative Example 1.

The change of the irreversible loss of flux with a heating temperature is shown in FIG. 6.

Comparative Example 1

Example 1 was repeated except that the Ni-plated specimen was not heat-treated before the measurement of magnetic flux $\phi_0$. The change of the irreversible loss of flux with a heating temperature is also shown in FIG. 6.

As is clear from FIG. 6, the permanent magnet of Example 1 did not suffer from drastic drop of an irreversible loss of flux even at a temperature of about 220° C., while the permanent magnet of Comparative Example 1 underwent drastic drop of an irreversible loss of flux between 120° C. and 160° C.

Example 2

A magnet alloy having the same composition as in Example 1 was formed into a permanent magnet specimen of 10 mm×11 mm×8 mm in the same manner as in Example 1. After the specimen was subjected to Ni electroplating to an average thickness of 20 μm in a Watts bath, it was heat-treated in the same manner as in Example 1. The permanent magnet specimen had a rare earth element-rich layer having an average thickness of 1.0 μm beneath the Ni-plating layer. After the specimen was heated to 160° C. for 2 hours and cooled down to room temperature to measure magnetic properties. A demagnetization curve (4πI-H curve) of the specimen is shown in FIG. 7.

Comparative Example 2

Example 2 was repeated except that the Ni-plated specimen was not heat-treated before the measurement of magnetic properties. The 4πI-H curve of the specimen is also shown in FIG. 7.

Figure 7:
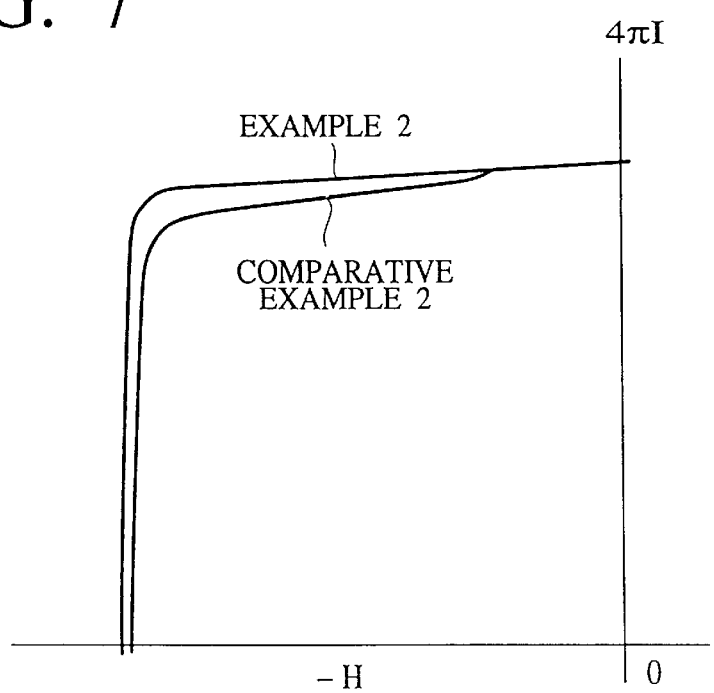
FIG. 7 is a graph showing 4πI-H curves in Example 2 and Comparative Example 2.

As is clear from FIG. 7, the permanent magnet of Example 2 did not suffer from lowering of 47πI, meaning that it had improved magnetic properties. On the other hand, the permanent magnet of Comparative Example 2 underwent drastic lowering of shoulder in a demagnetization curve.

Example 3

Figure 8:
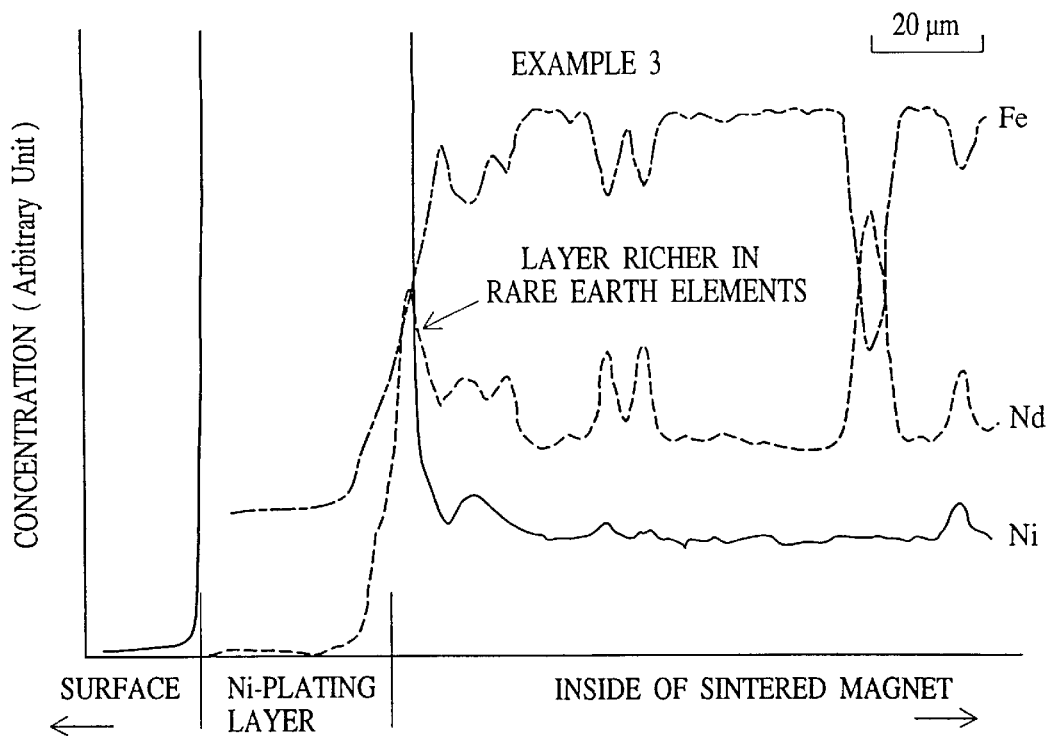
FIG. 8(a) is an EPMA chart showing the composition of the R—T—B-based, permanent magnet with a Ni-plating layer in a region from the inside of the permanent magnet to the Ni-plating layer in Example 3.
FIG. 8(b) is an EPMA chart showing the composition of the R—T—B-based, permanent magnet with a Ni-plating layer in a region from the inside of the permanent magnet to the Ni-plating layer in Comparative Example 3.
Figure 8:
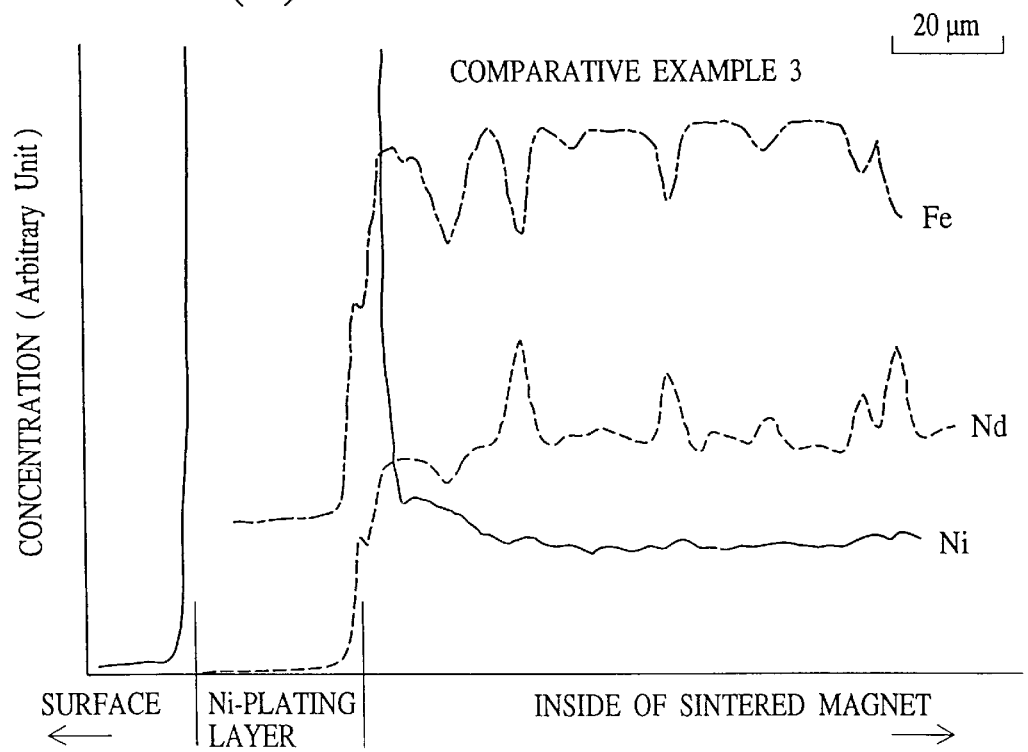

A magnet alloy having the same composition as in Example 1 was formed into a permanent magnet specimen of 10 mm×11 mm×9 mm in the same manner as in Example 1. After the specimen was subjected to Ni electroplating to an average thickness of 25 μm, the Ni-plated specimen was heat-treated under the same conditions as in Example 1 to form a layer of 1.2 μm in average thickness richer in rare earth elements than a main phase beneath the Ni-plating layer. A boundary region between the Ni electroplating layer and the permanent magnet body was subjected to an EPMA analysis. Further, the adhesion of the Ni electroplating layer to the permanent magnet body was measured by SEVASTIAN V available from QUAD GROUP. The results of EPMA analysis are shown in FIG. 8(a), and the adhesion of the Ni electroplating layer is shown in Table 1.

Comparative Example 3

A magnet alloy having the same composition as in Example 3 was formed into a permanent magnet specimen of 10 mm×11 mm×7.57 mm (magnetization direction: same as the direction of a 7.57-mm-long side direction) in the same manner as in Comparative Example 1. After the specimen was subjected to Ni electroplating to an average thickness of 20 μm, a boundary region between the Ni electroplating layer and the permanent magnet body was subjected to an EPMA analysis. Further, the adhesion of the Ni electroplating layer to the permanent magnet body was measured in the same manner as in Example 3. The results of EPMA analysis are shown in FIG. 8(b), and the adhesion of the Ni electroplating layer is shown in Table 1.

TABLE 1

| Example No. | Adhesion of Ni Electroplating Layer |
| --- | --- |
| Example 3 | 652 kgf/cm$^2$ |
| Comparative Example 3 | 416 kgf/cm$^2$ |

As is clear from FIGS. 3(a), (b) and Table 1, the adhesion of the Ni electroplating layer in Example 3 is greatly improved by forming the rare earth element-rich layer beneath the corrosion-resistant film layer.

Example 4

A permanent magnet-type motor having a structure shown in FIG. 4 was manufactured from a permanent magnet rotor 10 constituted by a shaft 3 (diameter: 20 mm) made of S45C, a ferromagnetic core 1 (diameter: 60 mm) made of S45C, and a cylindrical permanent magnet member 2 bonded to the core 1 by an adhesive, a stator 11 constituted by laminated silicon steel sheets for decreasing loss due to eddy current, and coils 12.

The cylindrical permanent magnet member 2 was Ni-plated by an electroplating method at an average thickness of 20 μm and heat-treated at 530° C. in vacuum for 2 hours. The Heat-treated, Ni-plated, cylindrical permanent magnet member 2 had a rare earth element-rich layer having an average thickness of 1.0 μm beneath the Ni-plating layer. The cylindrical permanent magnet member 2 was radially magnetized to have 8 magnetic poles with polarities changing alternately on a surface. The stator 11 had 24 slots 11b on an inner surface to define 24 teeth 11a, and disposed around the permanent magnet rotor 10 with a radial gap of 0.5 mm.

After measuring motor characteristics at room temperature, this permanent magnet-type motor was heated at 150° C. for 3 hours and cooled down to room temperature to measure the motor characteristics again. The results are shown in Table 2.

TABLE 2

| Measurement Condition | Magnetic Flux per one Tooth of Stator | Torque |
| --- | --- | --- |
| Before Heating | 0.32 mWb | 20.0 kg.cm |
| After Heating (150° C.) | 0.32 mWb | 20.0 kg.cm |

Comparative Example 4

A permanent magnet-type motor was produced in the same manner as in Example 4 except for using a permanent magnet which was not heat-treated after Ni plating. This permanent magnet-type motor was heated at 150° C. for 3 hours and cooled down to room temperature. Motor characteristics were measured before and after heating at 150° C. The results are shown in Table 3.

TABLE 3

| Measurement Condition | Magnetic Flux per one Tooth of Stator | Torque |
| --- | --- | --- |
| Before Heating | 0.32 mWb | 20.0 kg.cm |
| After Heating (150° C.) | 0.29 mWb | 19.1 kg.cm |

Example 5

A permanent magnet-type actuator having a structure shown in FIG. 5 was manufactured from a pair of back yokes 50a, 50b made of ferromagnetic steel (S45C), and blocks 52a, 52b, 53a, 53b made of a permanent magnet having the composition as in Example 1.

The permanent magnet blocks 52a, 52b, 53a, 53b were Ni-plated by an electroplating method at an average thickness of 25 μm and heat-treated at 530° C. in vacuum for 2 hours. Each permanent magnet block had a rare earth element-rich layer having an average thickness of 1.0 μm beneath the Ni-plating layer. The permanent magnet blocks 52a, 52b, 53a, 53b magnetized in a thickness direction were bonded to the back yokes 50a, 50b such that opposite magnetic poles are arranged not only on each permanent magnet surface facing the magnetic gap 55 but also between opposing pairs of the permanent magnet blocks 52a, 52b and 53a, 53b. A movable coil 54 was disposed in a magnetic gap 55 of 10 mm in width to complete the permanent magnet-type actuator.

This permanent magnet-type actuator was heated at 150° C. for 3 hours and cooled down to room temperature. A magnetic flux and a thrust force (at a constant current level of 5 A) of the movable coil 54 were measured before and after heating at 150° C. The results are shown in Table 4.

TABLE 4

| Measurement Condition | Magnetic Flux Density[1] | Thrust Force |
| --- | --- | --- |
| Before Heating | 0.60 T | 90 N |
| After Heating (150° C.) | 0.60 T | 90 N |

Note [1]Magnetic flux density between the permanent magnet blocks 52a, 52b and 53a, 53b.

Comparative Example 5

A permanent magnet-type actuator was produced in the same manner as in Example 5 except for using a permanent magnet which was not heat-treated after Ni plating. This permanent magnet-type actuator was heated at 150° C. for 3 hours and cooled down to room temperature. A magnetic flux and a thrust force (at a constant current level of 5 A) of the movable coil 54 were measured before and after heating at 150° C. The results are shown in Table 5.

TABLE 5

| Measurement Condition | Magnetic Flux Density[1] | Thrust Force |
| --- | --- | --- |
| Before Heating | 0.60 T | 90 N |
| After Heating (150° C.) | 0.54 T | 81 N |

Note [1]Same as under Table 4.

Example 6

A magnet alloy having a composition by weight of 23.5% of Nd, 7.0% of Pr, 1.5% of Dy, 0.2% of Al, 0.6% of Nb, 1.05% of B, 2.3% of Co, 0.1% of Ga and 0.08% of Cu, the balance being substantially Fe, was melted in a high-frequency furnace in an Ar gas atmosphere to produce a cast ingot. The resultant ingot was crushed into blocks of 50 mm or less, and the alloy blocks were charged into a container into which an Ar gas was introduced for 20 minutes to purge air. After introducing a hydrogen gas at 1 kgf/cm$^2$ into the container for 2 hours, the alloy blocks were mechanically pulverized to coarse powder having an average diameter of 500 µm. The coarse powder was then finely pulverized by a jet mill to fine powder having an average diameter of 5.0 µm.

The fine powder was charged into a cavity of a die equipped with a lower plunger movable up and down, and compacted at 2 ton/cm$^2$ into a green body while being oriented in a magnetic field of about 10 kOe. The resultant green body was sintered at 1080° C. for 2 hours and then heat-treated at 900° C. for 1 hour in an Ar gas atmosphere. A specimen of 10 mm×11 mm×8 mm (magnetization direction: same as the direction of an 8-mm-long side) was machined from the resultant sintered magnet, ground and pretreated with a phosphoric acid solution, and then subjected to Ni electroplating to an average thickness of 20 µm in a Watts bath.

Figure 9:
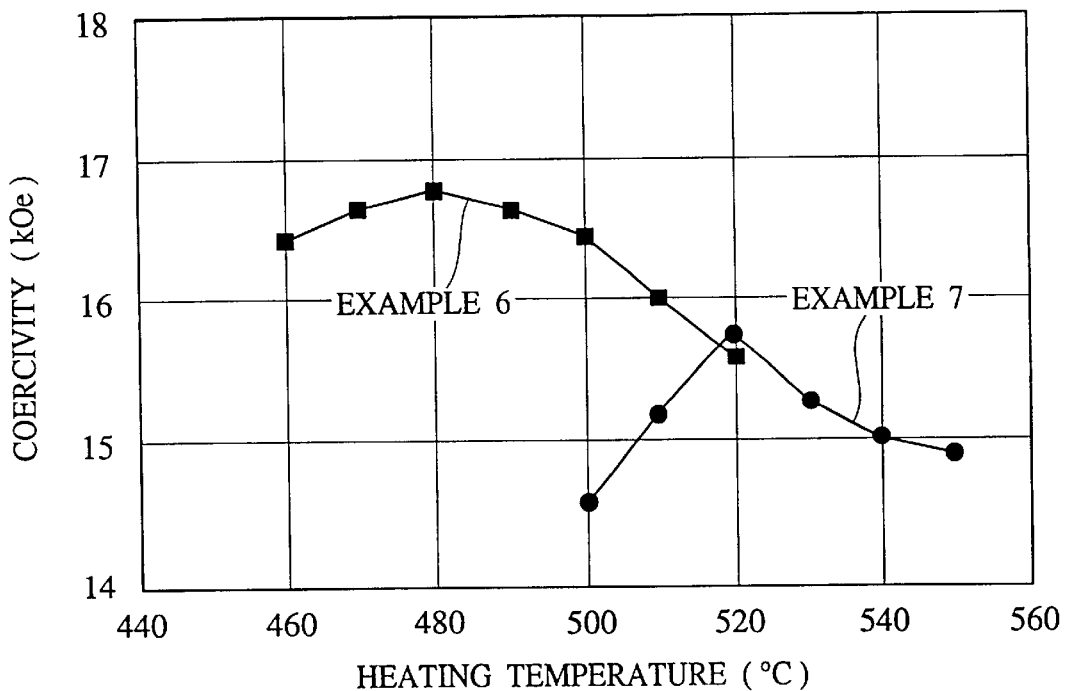
FIG. 9 is a graph showing the change of coercivity with a heat treatment temperature in Examples 6 and 7.
Figure 10:
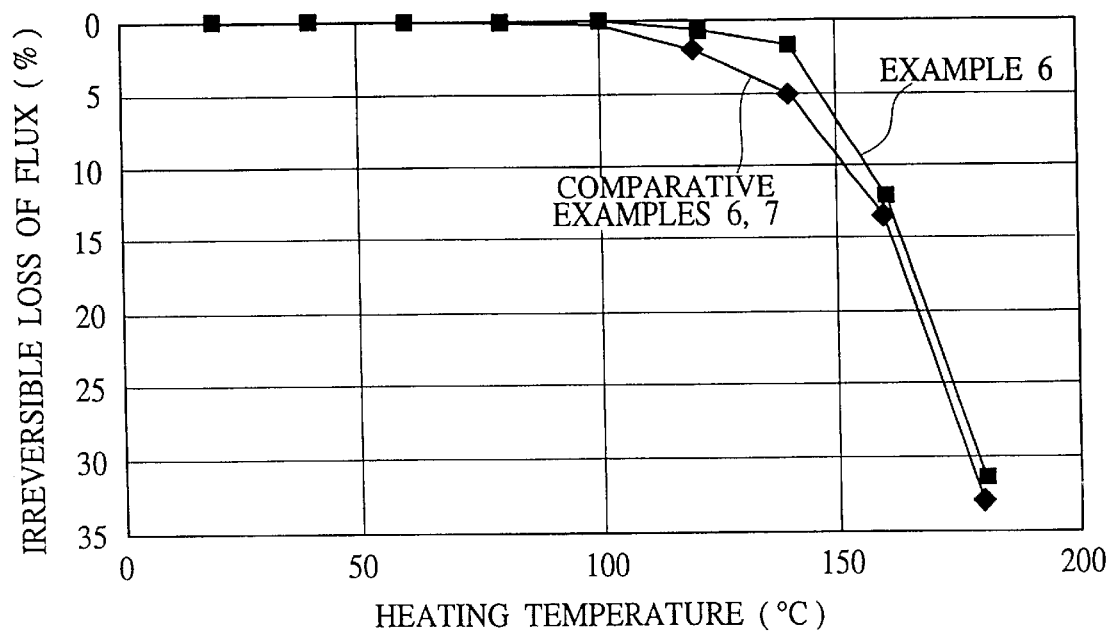
FIG. 10 is a graph showing the change of an irreversible loss of flux with a heating temperature in Example 6 and Comparative Examples 6 and 7.

Each of the Ni-plated specimens was heat-treated at a temperature between 460° C. and 520° C. (460° C., 470° C., ... 520° C.) each for 1 hour in an Ar gas atmosphere to form a rare earth element-rich layer beneath the Ni-plating layer. The heat-treated, Ni-plated specimen was then measured with respect to coercivity and an irreversible loss of flux. FIG. 9 shows the change of coercivity with the heat treatment temperature, and FIG. 10 shows the change of irreversible loss of flux with a heating temperature. With respect to the specimen heat-treated at 480° C., the adhesion of the Ni electroplating layer to the permanent magnet body was measured by SEVASTIAN V. The results are shown in Table 6.

Example 7

A magnet alloy having a composition by weight of 23.5% of Nd, 7.0% of Pr, 1.5% of Dy, 0.2% of Al, 0.6% of Nb, 1.05% of B, 2.3% of Co, 0.1% of Ga and 0.08% of Cu, the balance being substantially Fe, was melted in a high-frequency furnace in an Ar gas atmosphere to produce a cast ingot. The resultant ingot was crushed and pulverized to fine powder having an average diameter of 5.0 µm by the same procedure as in Example 6.

The fine powder was charged into a cavity of a die equipped with a lower plunger movable up and down, and compacted at 2 ton/cm$^2$ into a green body while being oriented in a magnetic field of about 10 kOe. The resultant green body was sintered at 1080° C. for 2 hours and then heat-treated at 900° C. for 1 hour in an Ar gas atmosphere. A specimen of 10 mm×11 mm×8 mm (magnetization direction: same as the direction of an 8-mm-long side) was machined from the resultant sintered magnet, ground and pretreated with a phosphoric acid solution, and then subjected to Ni electroplating to an average thickness of 20 µm in a Watts bath.

Each of the Ni-plated specimens was heat-treated at a temperature between 500° C. and 550° C. (500° C., 510° C., ... 550° C.) each for 1 hour in an Ar gas atmosphere to form a rare earth element-rich layer beneath the Ni-plating layer. The heat-treated, Ni-plated specimen was then measured with respect to coercivity and an irreversible loss of flux. FIG. 9 shows the change of coercivity with the heat treatment temperature. With respect to the specimen heat-treated at 520° C., the adhesion of the Ni electroplating layer to the permanent magnet body was measured by SEVASTIAN V. The results are shown in Table 6.

As is clear from FIG. 9, both R—T—B-based, permanent magnets in Examples 6 and 7 have a high coercivity, and the coercivity is stabler in the R—T—B-based, permanent magnet of Example 6 (heat-treated at a temperature between 460° C. and 520° C.) than in the R—T—B-based, permanent magnet of Example 7 (heat-treated at a temperature between 500° C. and 550° C.).

Comparative Example 6

A magnet alloy having the same composition as in Example 6 was formed into a green body in the same manner as in Example 6. The green body was sintered at 1080° C. for 2 hours and heat-treated at 900° C. and 480° C. each 1 hour to produce a permanent magnet. A specimen of 10 mm×11 mm×8 mm (magnetization direction: same as the direction of an 8-mm-long side) was machined from the resultant sintered magnet, ground and pretreated with a phosphoric acid solution, and then subjected to Ni electroplating to an average thickness of 20 µm in a Watts bath.

The Ni-plated specimen was measured with respect to an irreversible loss of flux. FIG. 10 shows the change of irreversible loss of flux with the heating temperature. The adhesion of the Ni electroplating layer to the permanent magnet body was measured by SEVASTIAN V. The results are shown in Table 6.

TABLE 6

| Example No. | Adhesion of Ni Electroplating Layer |
| --- | --- |
| Example 6 | 530 kgf/cm$^2$ |
| Example 7 | 525 kgf/cm$^2$ |
| Comparative Example 6 | 30 kgf/cm$^2$ |

With respect to the adhesion of the Ni electroplating layer to permanent magnet body, Examples 6 and 7 (both heat-treated) are extremely superior to that of Comparative Example 6 (without heat treatment).

Comparative Example 7

A magnet alloy having the same composition as in Example 6 was formed into a green body in the same manner as in Example 6. The green body was sintered at 1080° C. for 2 hours and heat-treated at 900° C. and 480° C. each 1 hour to produce a permanent magnet. A specimen of 10 mm×11 mm×8 mm (magnetization direction: same as the direction of an 8-mm-long side) was machined from the resultant sintered magnet, ground and pretreated with a phosphoric acid solution, and then subjected to Ni electroplating to an average thickness of 20 μm in a Watts bath.

The Ni-plated specimen was heat-treated at 200° C. for 1 hour in an Ar gas atmosphere. The heat-treated, Ni-plated specimen was measured with respect to an irreversible loss of flux. FIG. 10 shows the change of irreversible loss of flux with a heating temperature.

As is clear from FIG. 10, the irreversible loss of flux decreases by only about 2% at 140° C. in Example 6. In Comparative Example 7 in which the heat treatment was carried out at 200° C., the irreversible loss of flux was as low as in Comparative Example 6 in which no heat treatment was carried out. Accordingly, it may be concluded that the temperature of the heat treatment after the formation of the corrosion-resistant film layer is preferably 400–700° C.

As described above in detail, the R—T—B-based, permanent magnet of the present invention having a corrosion-resistant film layer well adhered to a magnet body thereof shows improved resistance to the change of magnetic properties with time even at an elevated temperature. Accordingly, it is highly useful for permanent magnet-type motors and actuators which may be subject to a temperature of 120° C. or higher.

What is claimed is:

1. A method for producing an R—T—B-based, permanent magnet, wherein R is one or more of rare earth elements including Y, and T is Fe, part of which may be substituted by Co, said permanent magnet having:
    (a) a corrosion-resistant layer located on the surface of said permanent magnet, wherein said corrosion-resistant layer is formed by electroplating or electroless plating and is made of a metal or alloy of at least one element selected from the group consisting of Zn, Cr, Ni, Cu, Sn, Pb, Cd, Ti, W, Co, Al, and Ta, or being made of a compound of at least one element selected from the group consisting of Zn, Cr, Ni, Cu, Sn, Pb, Cd, Ti, W, Co, Al, and Ta, and at least one element selected from the group consisting of C, P, S, N, and O; and
    (b) a main phase of $R_2Fe_{14}B$ and a layer richer in rare earth elements than said main phase, wherein said layer richer in rare earth elements is located beneath said corrosion-resistant layer;
    said R—T—B-based, permanent magnet being formed from an alloy having a composition by weight of 20–45% R, 0.5–6% B, 0.1–15% Co, 5% or less Cu, 0.5–10% at least one additive element selected from the group consisting of Al, Si, Nb, Mo, V, Mn, Sn, Ni, Zn, Ti, Cr, Ta, W, Ge, Zr, Hf, and Ga, and the balance being Fe,
    said method comprising:
    (1) forming said corrosion-resistant layer on a surface of a sintered magnet having said composition of R—T—B; and
    (2) subjecting said sintered magnet provided with said corrosion-resistant layer to a heat treatment at a temperature of 400–700° C. in an inert or non-oxidizing atmosphere or in vacuum, such that said layer richer in rare earth elements than said main phase of $R_2Fe_{14}B$ is generated beneath said corrosion-resistant layer.

2. The method for producing an R—T—B-based, permanent magnet according to claim 1, wherein said layer richer in rare earth elements than said main phase of $R_2Fe_{14}B$ beneath said corrosion-resistant layer has an average thickness of 10 μm or less.

3. The method for producing an R—T—B-based, permanent magnet according to claim 1, wherein said corrosion-resistant layer is a single-layer or multi-layer film having an average thickness of 5 μm or more.

4. A method for producing an R—T—B-based, permanent magnet, wherein R is one or more of rare earth elements including Y, and T is Fe, part of which may be substituted by Co, said permanent magnet having:
    (a) a first corrosion-resistant layer located on the surface of said permanent magnet, wherein said corrosion-resistant layer is formed by electroplating or electroless plating and is made of a metal or alloy of at least one element selected from the group consisting of Zn, Cr, Ni, Cu, Sn, Pb, Cd, Ti, W, Co, Al, and Ta, or being made of a compound of at least one element selected from the group consisting of Zn, Cr, Ni, Cu, Sn, Pb, Cd, Ti, W, Co, Al, and Ta, and at least one element selected from the group consisting of C, P, S, N, and O; and
    (b) a main phase of $R_2Fe_{14}B$ and a layer richer in rare earth elements than said main phase, wherein said layer richer in rare earth elements is located beneath said corrosion-resistant layer; and
    (c) a second corrosion-resistant layer on a surface of said first corrosion-resistant layer,
    said method comprising:
    (1) forming said first corrosion-resistant layer on a surface of a sintered magnet having a composition consisting essentially of by weight 20–45% R, 0.5–6% B. 0.1–15% Co, 5% or less Cu, 0.5–10% of at least one additive element selected from the group consisting of Al, Si, Nb, Mo, V, Mn, Sn, Ni, Zn, Ti, Cr, Ta, W, Ge, Zr, Hf, and Ga, and the balance being Fe;
    (2) subjecting said sintered magnet provided with said first corrosion-resistant layer to a heat treatment at a temperature of 400–700° C. in an inert or non-oxidizing atmosphere or in vacuum, such that a layer richer in rare earth elements than said main phase of $R_2Fe_{14}B$ is generated beneath said first corrosion-resistant layer; and
    (3) forming said second corrosion-resistant layer on a surface of the heat-treated sintered magnet.

5. The method for producing an R—T—B-based, permanent magnet according to claim 1, wherein said additive element is a combination of Al, Nb, and Ga, or a combination of Al, Nb, Ga, and at least one element selected from the group consisting of Si, Mo, V, Mn, Sn, Ni, Zn, Ti, Cr, Ta, W, Ge, Zr, and Hf.

6. The method for producing an R—T—B-based, permanent magnet according to claim 1, wherein said permanent magnet has a heat resistance of 120° C. or higher.

7. A method for producing an R—T—B-based, permanent magnet, wherein R is one or more of rare earth elements including Y, and T is Fe, part of which may be substituted by Co, said permanent magnet having:
    (a) a corrosion-resistant layer located on the surface of said permanent magnet, wherein said corrosion-resistant layer is made of a metal or alloy of at least one element selected from the group consisting of Zn, Cr, Ni, Cu, Sn, Pb, Cd, Ti, W, Co, Al, and Ta, or being made of a compound of at least one element selected from the group consisting of Zn, Cr, Ni, Cu, Sn, Pb, Cd, Ti, W, Co, Al, and Ta, and at least one element selected from the group consisting of C, P, S, N, and O; and
    (b) a main phase of $R_2Fe_{14}B$ and a layer richer in rare earth elements than said main phase, wherein said layer richer in rare earth elements is located beneath said corrosion-resistant layer;

said R—T—B-based, permanent magnet being formed from an alloy having a composition by weight of 20–45% R, 0.5–6% B, 0.1–15% Co, 5% or less Cu, 0.5–10% at least one additive element selected from the group consisting of Al, Si, Nb, Mo, V, Mn, Sn, Ni, Zn, Ti, Cr, Ta, W, Ge, Zr, Hf, and Ga, and the balance being Fe, said method comprising:

(1) forming said corrosion-resistant layer on a surface of a sintered magnet having said composition of R—T—B; and (2) subjecting said sintered magnet provided with said corrosion-resistant layer to a heat treatment at a temperature of 400–700° C. in an inert or non-oxidizing atmosphere or in vacuum, such that said layer richer in rare earth elements than said main phase of $R_2Fe_{14}B$ is generated beneath said corrosion-resistant layer.

8. A method for producing an R—T—B-based, permanent magnet, wherein R is one or more of rare earth elements including Y, and T is Fe, part of which may be substituted by Co, said permanent magnet having:

(a) a first corrosion-resistant layer located on the surface of said permanent magnet, wherein said corrosion-resistant layer is made of a metal or alloy of at least one element selected from the group consisting of Zn, Cr, Ni, Cu, Sn, Pb, Cd, Ti, W, Co, Al, and Ta, or being made of a compound of at least one element selected from the group consisting of Zn, Cr, Ni, Cu, Sn, Pb, Cd, Ti, W, Co, Al, and Ta, and at least one element selected from the group consisting of C, P, S, N, and O; and (b) a main phase of $R_2Fe_{14}B$ and a layer richer in rare earth elements than said main phase, wherein said layer richer in rare earth elements is located beneath said corrosion-resistant layer; and (c) a second corrosion-resistant layer on a surface of said first corrosion-resistant layer, said method comprising:

(1) forming said first corrosion-resistant layer on a surface of a sintered magnet having a composition consisting essentially of by weight 20–45% R, 0.5–6% B, 0.1–15% Co, 5% or less Cu, 0.5–10% of at least one additive element selected from the group consisting of Al, Si, Nb, Mo, V, Mn, Sn, Ni, Zn, Ti, Cr, Ta, W, Ge, Zr, Hf, and Ga, and the balance being Fe;

(2) subjecting said sintered magnet provided with said first corrosion-resistant layer to a heat treatment at a temperature of 400–700° C. in an inert or non-oxidizing atmosphere or in vacuum, such that a layer richer in rare earth elements than said main phase of $R_2Fe_{14}B$ is generated beneath said first corrosion-resistant layer; and (3) forming said second corrosion-resistant layer on a surface of the heat-treated sintered magnet.

* * * * *